(12) United States Patent
Durand et al.

(10) Patent No.: US 11,816,863 B2
(45) Date of Patent: Nov. 14, 2023

(54) METHOD AND DEVICE FOR ASSISTING THE DRIVING OF AN AIRCRAFT MOVING ON THE GROUND

(71) Applicant: Airbus (SAS), Blagnac (FR)

(72) Inventors: Alexis Durand, Blagnac (FR); Juliette Charpentier, Blagnac (FR)

(73) Assignee: Airbus (SAS), Blagnac (FR)

( * ) Notice: Subject to any disclaimer, the term of this patent is extended or adjusted under 35 U.S.C. 154(b) by 214 days.

(21) Appl. No.: 17/358,519

(22) Filed: Jun. 25, 2021

(65) Prior Publication Data
US 2021/0407129 A1    Dec. 30, 2021

(30) Foreign Application Priority Data

Jun. 25, 2020 (FR) ...................................... 2006678

(51) Int. Cl.
*G06T 7/73* (2017.01)
*G06V 10/44* (2022.01)
*G06V 10/42* (2022.01)
*G06V 20/56* (2022.01)
*G08G 5/06* (2006.01)

(52) U.S. Cl.
CPC ................ *G06T 7/75* (2017.01); *G06V 10/42* (2022.01); *G06V 10/443* (2022.01); *G06V 20/588* (2022.01); *G08G 5/065* (2013.01); *G06T 2207/30256* (2013.01)

(58) Field of Classification Search
CPC . G06T 7/75; G06T 2207/30256; G06V 10/42; G06V 10/443; G06V 20/588; G08G 5/065; G08G 5/0021; G05D 1/0083
See application file for complete search history.

(56) References Cited

U.S. PATENT DOCUMENTS

2007/0032924 A1    2/2007  Foucart et al.
2007/0241936 A1*  10/2007  Arthur ................. G08G 5/0021
                                                              359/13
(Continued)

FOREIGN PATENT DOCUMENTS

EP    2 378 460    10/2011
FR    2 808 588    11/2001
FR    3 003 989    10/2014

OTHER PUBLICATIONS

UAS Pilot Support for Departure, Approach and Airfield Operations—2009 (Year: 2009).*

(Continued)

*Primary Examiner* — Nizar N Sivji
(74) *Attorney, Agent, or Firm* — Nixon & Vanderhye P.C.

(57) ABSTRACT

A method and device for assisting the driving of an aircraft (AC) moving on the ground, on a taxiing circuit (CP) including a taxi line (TL) to be followed by the aircraft (AC). The taxi line (TL) has different portions (PR) forming between them intersections (IP). The device is configured to use a digital modeling of the taxi line (TL), called digital trajectory (TR), including nodes corresponding to the intersections (IP). In addition, the device includes a detection unit (4) configured to detect at least one of the intersections (IP), as well as an increment unit (6) configured to increment a counter associated with the digital trajectory (TR), after detection of the intersection (IP), the counter being designed to count a series of the nodes.

14 Claims, 4 Drawing Sheets

(56) References Cited

U.S. PATENT DOCUMENTS

| | | | |
|---|---|---|---|
| 2008/0177427 A1 | 7/2008 | Marty et al. | |
| 2009/0150009 A1* | 6/2009 | Villaume | G08G 5/065 |
| | | | 701/3 |
| 2009/0299552 A1* | 12/2009 | Villaume | G08G 5/0043 |
| | | | 701/3 |
| 2011/0125400 A1* | 5/2011 | Michel | G08G 5/0021 |
| | | | 701/532 |
| 2014/0288815 A1* | 9/2014 | Bousquet | G08G 5/04 |
| | | | 701/301 |
| 2014/0303815 A1* | 10/2014 | Lafon | G08G 5/065 |
| | | | 701/3 |
| 2016/0005319 A1* | 1/2016 | Cros | H04N 7/18 |
| | | | 701/3 |
| 2016/0052641 A1* | 2/2016 | Olofinboba | G08G 5/065 |
| | | | 340/978 |
| 2016/0171899 A1* | 6/2016 | Depare | G08G 5/0021 |
| | | | 701/428 |
| 2016/0180720 A1* | 6/2016 | Auletto | G01C 23/00 |
| | | | 701/533 |
| 2018/0090019 A1* | 3/2018 | Scacchi | G08G 5/0008 |
| 2019/0027051 A1* | 1/2019 | Veronesi | G08G 5/0021 |
| 2019/0347943 A1* | 11/2019 | Pesik | B64D 47/08 |
| 2020/0202733 A1* | 6/2020 | Staudinger | G06N 3/08 |

OTHER PUBLICATIONS

Aircraft Intersection Collision Conflict Detection and Resolution under the Control of A-SMGCS—2012 (Year: 2012).*
Automation Tools for High-Precision Taxiing—2007 (Year: 2007).*
Search Report for FR Application No. 2006678 dated Mar. 12, 2021, 2 pages.

* cited by examiner

METHOD AND DEVICE FOR ASSISTING THE DRIVING OF AN AIRCRAFT MOVING ON THE GROUND

RELATED APPLICATION

This application claims priority to French patent application 2006678 filed Jun. 25, 2020, the entirety of which is incorporated by reference.

TECHNICAL FIELD

The present invention relates to a method and a device for assisting the driving of an aircraft moving on the ground, such as along a taxiing circuit at an airport.

The present invention applies in particular to aircraft, such as for civilian or military missions to transport passengers and/or merchandize (freight), or to a drone moving on a field, and in particular to an aircraft moving along the ground of an airport field such as an airport or an aerodrome.

BACKGROUND

During the phase of an aircraft moving on the ground on an airport field, the pilot can be led to follow a taxiing circuit comprising several taxiways, including runways and turn-around rackets. The pilot must then be able at every moment to ensure that the aircraft remains correctly on the defined taxiing circuit. Furthermore, the pilot must be able at every moment to determine with ease the position of the aircraft on the taxiing circuit.

While taxiing an aircraft, a pilot typically relies on a visual aid system at an airport comprising ground marks, information and signaling signposts. The pilot may also communicate with an official on the ground, such as a marshaler and/or an air traffic controller. The pilot may also rely on a satellite navigation system and a digital airport map to determine the position of the aircraft on the taxiing circuit at the airport.

The interactions with the visual aid system require much of the pilot's attention during taxiing. By focusing on the visual aid system, the pilot's attention may be diverted from other elements of the outside environment (such as vehicles driving on the airport field, buildings, and mobile gateways) and/or from executing controlling movements of the aircraft.

Furthermore, aircraft manufacturers are developing aircraft that are autonomous or at least semi-autonomous during ground operations. The reliance of such aircraft on satellite navigation systems to localize the aircraft's position in real time on a taxiing circuit is an obstacle to autonomous ground operations.

SUMMARY

The invention disclosed herein may be applied to remedy, at least in part, the problems discussed above regarding ground operations of an aircraft and particularly taxiing of an aircraft.

The invention may be embodied as a method to assist driving an aircraft on the ground along a taxiing circuit, which includes a taxi line, e.g., path, to be followed by the aircraft. The taxi line having a plurality of portions forming intersections between them. The method may use a digital modeling of the taxi line to be followed, called a digital trajectory. The digital trajectory includes nodes corresponding to the intersections between the portions of the taxi line. The steps of the method may be:

Detecting the intersections of the taxi line being followed by the aircraft. A detection unit may be used to detect the taxi line and is configured to detecting at least one of the intersections of the taxi line, and Incrementing a counter associated with the digital trajectory, after the detection of each intersection, wherein the counter counts the nodes of the digital trajectory in response to the detection of each intersection of the taxi line.

By implementing a step of detecting a taxi line followed by incrementing a counter to track an aircraft's ground movement along a digital trajectory and across the intersections, it is possible to use a digital trajectory of a desired taxi line for the aircraft and guide the physical aircraft along the physical taxi line on the ground.

These steps make it possible to relieve the pilot's workload during movement of the aircraft on the ground. The pilot can then devote him/herself to other tasks to control the aircraft. Furthermore, by associating a digital trajectory to the physical taxi line to be followed by the aircraft, a localization system can be implemented to guide the movement of the aircraft on a taxiing circuit of an airport.

The detection step of the taxi line may include an acquisition sub-step, implemented by an acquisition unit. The acquisition sub-step may include producing, during movement of the aircraft on the taxiing circuit, a sequence of frames, e.g., images, of a scene near the aircraft. Each frame captures a scene of the taxiing circuit at or near the location of the aircraft in real time or near real time, such as within 10 seconds to 30 seconds. The frames may show the scene immediately in front of the aircraft. The frames are used to determine an actual location of the aircraft on the taxiing circuit in real time and to position actual location to the digital trajectory.

The detection step of the taxi line may include a first sub-step of iterative analysis of the frames which detects passage of the aircraft across intersections of the taxi line. The frames of scenes are used to identify the intersections on the taxi line, and thereby locate the aircraft on the taxi line. The iterative analysis is repeated using new frames captures of scenes as the aircraft moves along the taxi line. Each iterative analysis may include detection of secant lines in one of the frames.

The iterative analysis may include a first test indicating to proceed with said first iterative analysis without incrementing the counter if it is determined that a new intersection is not being crossed, or to increment the counter if it is determined that a new intersection is being crossed by the aircraft. Said first iterative analysis may focus on frames supplied by a first camera of the acquisition unit, where the first camera is mounted in a cockpit of the aircraft.

The detection step of the taxi line may be followed by a second sub-step of iterative analysis of the frames. The second sub-set of iterative analysis may be conducted in a manner nested with the first iterative analysis. The second sub-set of iterative analysis may aim to detect the taxi line to be followed in the frames, and in particular a portion along said taxi line. This second sub-set iterative analysis may focus on frames supplied by a second camera of the acquisition unit, where the second camera mounted behind a nose landing gear of the aircraft. As a variant, the frames used for the second sub-step may be the same frames used for the first sub-step of the iterative analysis.

The detection step of the taxi line may include an initialization sub-step, implemented by an initialization unit integrated in said detection unit. The initialization sub-step may include identifying, in a first one of said frames, a start of the taxi line to be followed by the aircraft.

The detection step of the taxi line may include an extension sub-step, implemented by an extension unit integrated in said detection unit. The extension sub-step may include extending, in one of said frames, a contour of the taxi line to be followed for comparison with one of the following frames.

The detection step of the taxi line may include a discrimination sub-step, implemented by a discrimination unit integrated in said detection unit. The discrimination sub-step may include determining the taxi line to be followed from among several lines shown in said frames. The discrimination sub-step may include a calculation operation, implemented by a calculation unit integrated in said discrimination unit. The calculation step may calculate angles formed by lines shown in a frame(s). The calculation step may also include comparing the calculated angles with a predefined angle formed by the taxi line to be followed. The calculation step identifies the taxi line in the frame(s) based on the comparison of the predefined angle to the calculated angles. The predefined angle may be associated with an intersection on the taxi line and a value of the counter.

The detection step of the taxi line may include a marks sub-step, implemented by a marks unit. The marks sub-step may include determining, in the frames, a mark along the taxi line to be followed. The marks sub-step may include a first calculation operation, implemented by a first calculation unit integrated in the marks unit. The first calculation operation may include determining, in the frames, an angle, called first angle, formed between the taxi line to be followed including the mark and a projection on the ground of a longitudinal axis of the aircraft.

The marks sub-step may further comprise a second calculation operation, implemented by a second calculation unit integrated in the marks unit. The second calculation operation may include determining in the frames an azimuth error $\psi\Delta$, formed between said projection and a straight line joining the mark and a point, called follower point, situated on said projection. In particular, the follower point can be an image of a center of gravity of the aircraft on said projection.

The azimuth error $\psi\Delta$ is associated with a reference angle, called azimuth, formed between the straight line joining the mark and the follower point on one hand, and an axis of a local landmark linked to said mark, on the other hand. The azimuth may be determined during a third calculation operation implemented by a third calculation unit integrated in the marks unit.

The calculation operations may proceed through generation of a virtual circle having a center positioned at a follower point and a radius depending on a speed and/or an acceleration of the aircraft. With the taxi line to be followed, this virtual circle forms at least one intersection point corresponding to the mark. Generation of the virtual circle may be implemented by a generation unit integrated in the marks unit.

The marks sub-step may include a validation operation, implemented by a validation unit integrated in the marks unit. The marks sub-step may include validating a first value of the azimuth by comparison with a second value of said azimuth.

The method may include a control step consisting of driving the aircraft along the taxi line to be followed, in particular to the mark, in the event of a lateral and/or angular deviation of said aircraft with respect to said taxi line to be followed, or of driving the aircraft along said axis of the local landmark linked with said mark, according to a lateral and/or angular deviation of said aircraft with respect to said axis. This control step comprises a sub-step of generation of an order from a data item relative to said first angle, or to said azimuth error $\psi\Delta$, or from a data item relative to the azimuth.

The method may comprises a sub-step of image processing aiming to transform the frames supplied by the acquisition unit through successive operations. This image-processing sub-step is implemented by an image-processing unit communicating with the acquisition unit. Furthermore, this image-processing sub-step may comprise the following operations, each dedicated to a particular type of image processing:

I. a homography operation, implemented by a homography unit integrated in the image processing unit. The homography operation may include transforming, in the frames, an oblique view of the scene according to the acquisition unit to a vertical view of said scene according to a hypothetical camera situated in the plumb line of the aircraft, II. a conversion operation, implemented by a conversion unit integrated in the image processing unit The conversion operation may include converting the frames encoded according to a first RGB (Red, Green Blue) color management system to a second HSV (Hue, Saturation, Value) color management system and/or a binarization operation, implemented by a binarization unit integrated in the image-processing unit, consisting of binarizing the frames.

The present invention may also relate to a device for assisting the driving of an aircraft moving on the ground on a taxiing circuit comprising a taxi line to be followed by the aircraft, said line having a plurality of portions forming intersections between them. The device is configured to use a digital modeling of said line to create a digital trajectory of the taxi line. The digital trajectory includes nodes corresponding to the intersections in the taxi line.

The device may include a detection unit configured to detect the intersections as the aircraft moves along the taxi line, and an increment unit configured to increment a counter as the aircraft moves across an intersection in the taxi line, wherein the count is used to track the movement of the aircraft along the digital trajectory. The counter is designed to count a series of nodes forming the digital trajectory.

The detection unit may also include an acquisition unit configured to produce, during movement of the aircraft on the ground, a sequence of frames, e.g., images, of a scene near the aircraft, wherein each scene may be a portion of the taxiing circuit including the taxi line traced on said taxiing circuit. The scene may be forward looking from the aircraft and show the taxiing circuit in front of the aircraft.

The detection unit may also comprise a first iterative analysis unit to analyze frames. The first iterative analysis unit is configured to detect passage of one of the intersections in the frames. In particular, this first analysis unit is configured, in the event of detection of secant lines in one of the frames, to activate a first test able to indicate to proceed with said iterative analysis of the frames without incrementing the counter, until it is determined that an intersection has been crossed, or to proceed with a new iterative analysis of frames with incrementation of the counter if it is determined that a intersection us being crossed. Furthermore, said first analysis unit may be configured to be supplied with the frames by a first camera of the acquisition unit, wherein the first camera being mounted in a cockpit of the aircraft.

The detection unit may include a second iterative analysis unit configured to analyze the frames. The second iterative analysis unit may be configured to detect the taxi line to be followed in the frames. The second analysis unit may be configured to function in a manner nested with the first analysis unit. The second iterative analysis unit may be further configured to be supplied with frames by a second camera of the acquisition unit, wherein the second camera may be mounted behind a nose landing gear of the aircraft.

The detection unit may also include an initialization unit configured to initialize, in a first one of said frames, a start of the taxi line to be followed.

The detection unit may comprise an extension unit configured to extend in a virtual space of the digital modeling, in one of said frames, a contour of the taxi line to be followed. The extension may be used to compare to a contour of a taxi line predicted from analysis of a successive frame(s).

The detection unit may include a discrimination unit configured to determine the taxi line to be followed by an aircraft from among several lines present in a frame(s). The discrimination unit may comprise a calculation unit configured to calculate an angle formed by the taxi line to be followed based lines detected in one or more of the frames. The calculation unit may compare said angle with a predefined angle associated with a value of the counter to determine if the angle calculated from an image matches the predefined angle.

The detection unit may comprise a marks unit, configured to determine, in the frames, a mark along the taxi line to be followed.

In particular, the marks unit comprises a first calculation unit, configured to determine, in the frames, an angle, called first angle, formed between the taxi line to be followed that includes the mark and a projection on the ground of a longitudinal axis of the aircraft.

The marks unit may further comprise a second calculation unit configured to determine, in the frames, an azimuth error $\psi\Delta$ formed between the projection and a straight line joining the mark and a follower point, situated on said projection. The follower point may be an image of a center of gravity of the aircraft on said projection.

The azimuth error $\psi\Delta$ is associated with a reference angle, called azimuth, formed between the straight line joining the mark and the follower point, and an axis of a local landmark linked to said mark. The azimuth may be determined by means of a third calculation unit integrated in the marks unit.

The marks unit may comprise a generation unit designed to generate a virtual circle having a center positioned at the follower point and a radius depending on a speed and/or an acceleration of the aircraft. With the taxi line to be followed, this virtual circle forms at least one intersection point corresponding to the mark.

The marks unit may comprise a validation unit, configured to validate a first value of the azimuth by comparison with a second value of said azimuth.

The device may comprise a control unit configured to drive the aircraft along the taxi line to be followed, in particular to the mark, in the event of a lateral and/or angular deviation of said aircraft with respect to said taxi line to be followed, or to drive the aircraft along said axis of the local landmark linked with said mark, according to a lateral and/or angular deviation of said aircraft with respect to said axis. This control unit may be configured to produce an order of movement of the aircraft from a data item relative to the first angle at the azimuth, and/or at the azimuth error $\psi\Delta$.

The device comprises an image-processing unit configured to transform the frames supplied by the acquisition unit through successive operations. To do this, the image-processing unit may comprise at least one of the following units, each designed to perform a particular type of image processing:

a homography unit, configured to transform, in the frames, an oblique view of the scene according to the acquisition unit to a vertical view of said scene according to a hypothetical camera situated in the plumb line of the aircraft, a conversion unit, configured to convert, in the frames, a first RGB color management system to a second HSV color management system and/or a binarization unit, configured to binarize the frames.

The present invention further relates to an aircraft, in particular a transport aircraft that is equipped with a device such as the abovementioned.

SUMMARY OF FIGURES

The attached figures illustrate an embodiment(s) and operation of the invention. On these figures, identical references designate similar elements.

DETAILED DESCRIPTION

Figure 1:
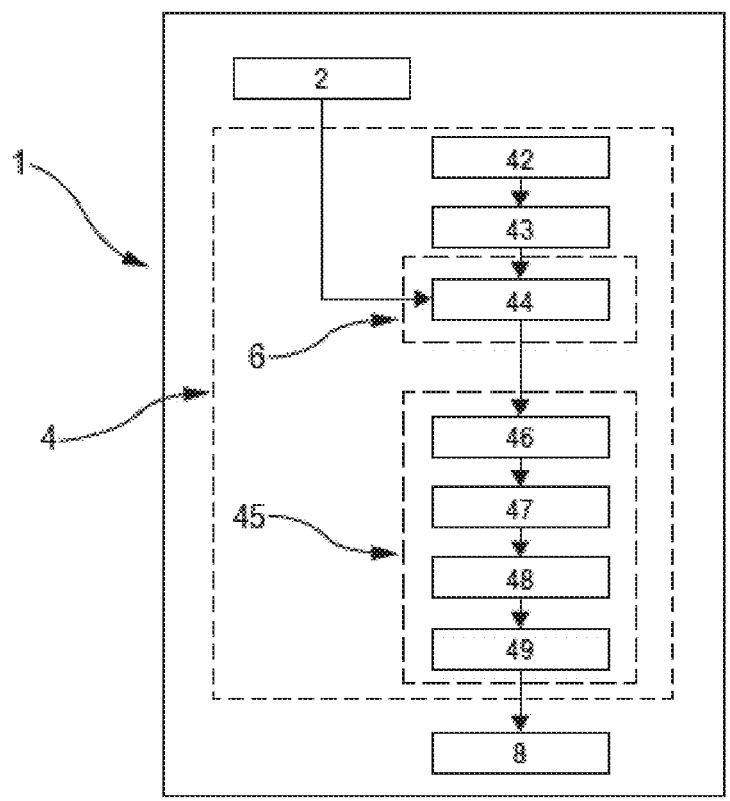
FIG. 1 is a synoptic diagram of an embodiment of a device for assisting the driving of an aircraft moving on the ground according to the invention.

The invention relates to a method and device for assisting the driving of an aircraft AC moving on the ground on a taxiing circuit CP defined on an airport field.

The taxiing circuit CP includes taxiways providing paths for an aircraft AC to move, for example between a parking area and a stopping point, before passing onto a takeoff runway; or between a landing runway and a parking area, in which case the landing runway and potentially turnaround rackets are part of the taxiing circuit; or between various zones of the airport field, such as those devoted to maintenance, provisioning, de-icing and other events.

The taxiing circuit CP may include one or more taxi lines traced on the ground. One of these taxi lines must be followed by the aircraft. It will be designated hereafter by as the taxi line TL to be followed. The taxi line TL is a physical path that the aircraft AC is to follow in a taxiing circuit CP.

The taxi line TL to be followed has a plurality of portions PR forming intersections IP. Each portion PR is associated with a taxiway, turnaround racket or a runway of the taxiing circuit CP. An intersection IP can mark a junction between a segment of the taxi line TL and another segment. The intersections may be locations were the taxi line TL to be followed intersects with other taxi paths or turns in the taxi line TL to be followed.

The device 1 comprises a detection unit 4 configured to perform detection of the taxi line TL to be followed. The detection unit detects the taxi line TL during movement of the aircraft AC on the taxiing circuit CP. The device 1 may include a control unit 8 configured to drive the aircraft AC automatically along the taxi line TL to be followed. The device 1, detection unit 4, increment unit 6 and control unit 8 may be implemented in a computer on-board the aircraft and configured, e.g. programmed, to perform detection in images, increment a counter and control the aircraft. These units may include software modules and/or hardware components configured to perform image analysis and detection of lines in an image, counting and actuating automated control elements of an aircraft.

The device detects intersections IP in the taxi line TL as the aircraft moves along the taxi line TL. The detection unit 4 is configured to use a digital trajectory TR which digitally models the taxi line TL to be followed.

The digital trajectory TR comprises nodes corresponding in a biunivocal manner to the intersections IP of the taxi line TL to be followed. For example, the nodes on the digital trajectory TR, e.g., digital map, corresponds to the physical intersections IP of the taxi line TL.

The nodes of the digital trajectory TR may also have an associated positive and/or negative angles indicating to turn left or right, or zero angles indicating to go straight ahead without changing direction. The positive and/or negative angles and zero angles are used to direct the aircraft along the taxi line TL as the aircraft approaches the intersections of the taxi line TL.

The digital trajectory TR can be presented in the form of a table putting the nodes and the angles associated with these nodes into correspondence. Such a table is given below to illustrate the angles associated with the nodes.

| TR | |
|---|---|
| Nodes | Angle to be followed (in degrees) |
| IP1 | 0 |
| IP2 | −30 |
| IP3 | 0 |
| IPX | 30 |

A counter is configured to count the nodes of the digital trajectory TR. When the detection unit 4 an intersection IP of the taxi line TL being followed by an aircraft, an increment unit 6 increment the counter. By detecting the intersections along the taxi line TL and counting the corresponding nodes in the digital trajectory TR, the device tracks the movement of the aircraft along the taxi line TL and may be configured provide commands to guide the aircraft along the taxi line TL.

Incrementing the counter is used to determine a position of the aircraft AC on the taxi line to be followed, based on information relative to one of the nodes of the digital trajectory TR corresponding to said intersection IP.

It should be noted that the increment unit 6 can be integrated or not into the detection unit 4.

The detection unit 4 communicates with a trajectory generator 2 configured to generate the digital trajectory TR. This trajectory can be generated from instructions communicated to the pilot by the control tower as a message and including the taxiways and runways to be used, and from Airport Map DataBase (AMDB) cartography of the airport field itemizing the taxiways and runways of the airport. As a variant, the detection unit 4 is configured to download the digital trajectory TR from a server of the trajectory generator 2.

The detection unit 4 may comprise an acquisition unit 42 including at least one first camera positioned at a cockpit and/or at least one second camera positioned behind a nose landing gear. The first camera and the second camera are configured to produce, during movement of the aircraft AC, a sequence of frames of a scene near the aircraft AC. The scene may show the ground, including taxiing circuit, in front of the aircraft AC. The scene shows the taxiing circuit CP and the taxi line TL to be followed traced on said taxiing circuit. As a variant, a single series of frames is supplied by a single camera.

The detection unit 4 comprises a display screen configured to display the frames as well as the taxi line TL to be followed, reproduced on said frames. The pilot thus has an indirect vision of the taxi line TL to be followed, called artificial vision or augmented vision.

Each camera of the acquisition unit 42 may be configured to supply up to 24 frames per second. The detection unit 4 may include a first iterative analysis unit 44 configured to detect in each of the frames a potential intersection IP. As an example, such an iterative analysis can include the determination of a region of interest around the intersection IP and then follow it from one frame to another by means of correlation filters, known to the person skilled in the art.

Generally, when an intersection IP is detected for the first time on a given frame, said intersection occupies a high position on said frame. Then, over the course of the frames, said intersection occupies an increasingly lower position until it completely disappears from the frames. This disappearance indicates that the aircraft AC has crossed the intersection or that the aircraft AC passed over the intersection.

The first iterative analysis unit 44 may be configured to detect an intersection and/or the crossing of an intersection. In connection with this detection function of said passage or said crossing, the first analysis unit 44 may be configured to activate a test in the event of detection of secant lines in one of the frames, and then to communicate a result of this test to the increment unit 6. The test may include analyzing each successive frame to determine if an intersection is the same as an intersection shown in a preceding frame and to detect if an intersection shown in a preceding frame is not show in a successive frame. This test is an iterative analysis of frames which does not result in the counter being incremented until a determination is made that an intersection IP is detected in a frame. The counter is not incremented as the same intersection IP is shown in subsequent frames. The first iterative analysis unit determines if the same intersection IP is shown in a successive frame or if a new intersection IP is shown in a successive frame. The first iterative analysis may compare the angle(s) formed between lines shown in the frame The test may also determine that the frames show a new intersection is being approached by the aircraft.

It can happen that more than one intersection IP is detected using the iterative analysis performed by the first iterative analysis unit. by the detection unit 4 in a single frame. In such a case, the iterative analysis, operated by the first analysis unit 44, analyzes each intersection in the frame and may identify each intersection over several consecutive frames. For example, the iterative analysis may detect a first intersection IP in a lower portion of the frame(s) and a second intersection IP in an upper port of the frame(s). The counter is incremented as the testing of each of the intersection IPs determines, for example, that the intersection has been first detected. The first iterative analysis unit 44 analyses frames to determine if a new intersection IP has appeared in a current frame (and not shown in a preceding frame) or if the same intersection IP is shown in both the current frame and a preceding frame.

The detection unit 4 may include a second iterative analysis unit 45 for iterative analysis of the frames configured to detect the taxi line TL to be followed, and may specifically detect a current portion PR of said taxi line TL that the aircraft is approaching or is moving over. The second analysis unit 45 may be nested with the first iterative analysis unit 44. "Nested" means that, at every iteration of the method, the first iterative analysis unit 44 and the second iterative analysis unit 45 are solicited, each of said analysis units performing in turn an iterative process dependent upon the other.

The first iterative analysis unit 44 and the second iterative analysis unit 45 can be supplied with frames by a single camera chosen between the first camera and the second camera of the acquisition unit 42. Alternatively, the first and second iterative analysis units may be fed images from different cameras, such as a cockpit camera feeding the first iterative acquisition unit and a nose gear camera feeding the second iterative acquisition unit.

The first iterative analysis unit 44 may be connected to the first camera which may have a wide field of vision due, at least in part, to its position at the cockpit. Because of the wide field of view, the number or rate of frames to be produced by the first camera may be slower than the second camera on the nose gear which may have a narrower field of view. Similarly, the number of frames to be analyzed by the first iterative analysis unit 44 to detect the crossing of an intersections IP of the taxi line TL may be relatively few.

The second iterative analysis unit 45 may be connected to the second camera, which has, because of its position behind or on the nose landing gear, a field of vision close to the taxi line TL to be followed.

As a variant, the first camera is chosen as a camera common to the two iterative analysis units 44, 45.

Figure 4A:
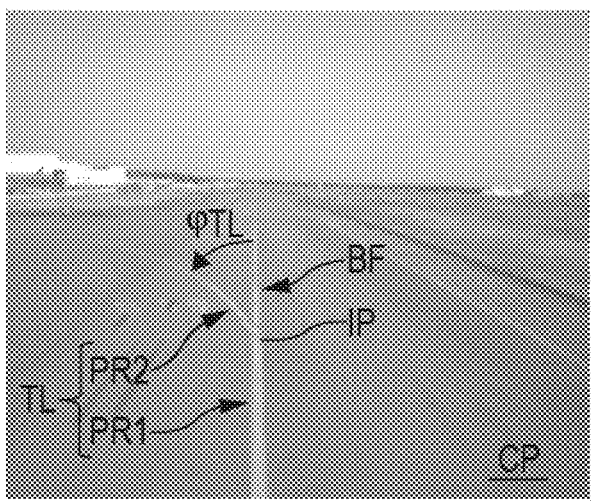
FIGS. 4a and 4b illustrate a frame supplied by a first camera of an acquisition unit of the device of FIG. 1, wherein a raw image frame is shown in FIG. 4a, and a frame transformed by homography is shown in FIG. 4b.

An example of a frame supplied by the first camera is given on FIG. 4a. The taxi line TL to be followed can be seen, as well as a line BF secant to the taxi line. The lines shown in FIG. 4a are lines painted on a taxiway. The junction between these two lines corresponds to one of the intersections IP of the taxi line TL to be followed. As evident from FIG. 41, the intersection IP has not yet been crossed by the aircraft AC. This intersection IP has already been detected by the detection unit because the intersection was visible in at least one preceding frame. The detection of the intersection in the preceding frame caused an incrementation of the counter. Due to the operation of the first iterative analysis unit, the appearance and detection of this same intersection IP in a subsequent frame, e.g. FIG. 4a, will not result in a new incrementation of the counter.

Figure 5A:
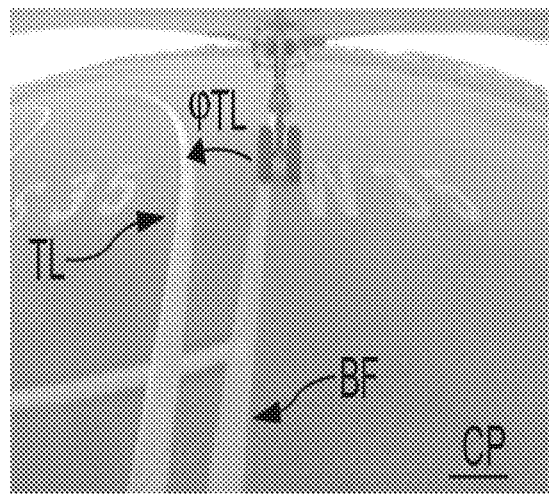
FIGS. 5a and 5b illustrate a frame supplied by a second camera of the acquisition unit of the device of FIG. 1, wherein a raw image frame is shown in FIG. 5a, and a frame transformed by homography is shown in FIG. 5b.

FIG. 5a illustrates an example of a frame supplied by the second camera. The image shows the nose gear wheel and a taxi line on which the nose gear wheel is travelling. The frame of FIG. 5a shows a curved line corresponding to the taxi line TL that the aircraft is to follow a straight line represented the portion of the taxi line TL that the aircraft is now following. The junction (not shown) between these two lines corresponds to one of the intersections IP of the taxi line TL to be followed. The intersection was previously counted by the counter as it appeared and was detected in a previous frame. This intersection IP has just been crossed by the aircraft AC.

A comparison between the frame illustrated on FIG. 4a and the frame illustrated on FIG. 5a shows that in the first case, a greater length of the taxi line TL is reproduced, whereas in the second case (FIG. 5a), a lesser length of the taxi line TL is reproduced. In the second case, more detail can be distinguished around the intersection just crossed by the aircraft AC. This is due to the position of the second camera behind the nose landing gear, which offers a field of vision close to the taxi line TL to be followed.

The detection unit 4 comprises an initialization unit 46 configured to initialize, in a first of said frames, a start of the taxi line TL to be followed.

The detection unit 4 may further include an extension unit 47 configured to extend, in one of the frames, a contour of the taxi line TL to be followed. The extension of the contour of the taxi line may assist when a comparison is made of the taxi line shown in a subsequent frame, such as the immediately following frame.

The detection unit 4 may further include a discrimination unit 48 configured to distinguish the taxi line TL to be followed from among at least one other taxi line appearing in a frame(s) To distinguish between taxi lines the discrimination unit 48 includes a calculation unit configured to calculate angles formed by the taxi lines appearing in a frame(s). As shown in FIG. 4a, an angle φTL is shown between an extension of a portion PR1 of the taxi line the aircraft is currently following and another portion PR2 which the aircraft is to follow after passing over an intersection IP between the two portions PR1 and PR2. The arrow in FIG. 4a designating angle φTL indicates a direction that the aircraft is to turn from portion PR1 onto portion PR2.

The discrimination unit 48 may also include a validation unit configured to validate a value of the angle φTL by comparison with a predefined value of the angle between portions PR1 and PR2. The predefined value is taken for example from a lookup table like the one given above that has an angle φTL for each of the nodes of the digital trajectory TR. The discrimination unit 48 selects the angle φTL based on, for example, a lookup table and the current number in the counter which indicates the next node/intersection that the aircraft is to traverse in the taxi line TL. The detection unit 4 functions in this manner using information relative to the probable direction of the taxi line TL to be followed in the frame undergoing analysis, for example straight ahead or to the left, at a certain angle, or to the right, at a certain angle. The information relative to the probable direction of the movement of the aircraft along the taxi line may be determined based on the count, global positioning systems (GPS), intended direction of movement information associated with the digital trajectory, and on-aircraft instruments such as a compass and a gyroscope.

The detection unit 4 may also include a marks unit 49 configured to determine a mark TP designed to be followed by the aircraft AC moving on the ground. This mark TP is defined in the frames, and may be along the taxi line TL to be followed.

The acquisition unit 42, the image processing unit 43, the first and second iterative analysis units 44, 45; the initialization unit 45, the extension module 47, the discrimination unit 48 and the marks unit 49 may be software modules included in the detection unit. These software modules may be configured to acquire images from cameras, process the images, and analyze the images such as by detecting a start of the taxi line, virtually extending portions of the imaged taxi line, discriminating lines in images representing the taxi line from other lines in the images and identify a mark associated with the location of the aircraft in the images. These units may include software modules and/or hardware components configured to perform image analysis and detection of lines in an image, counting and actuating automated control elements of an aircraft.

Figure 2:
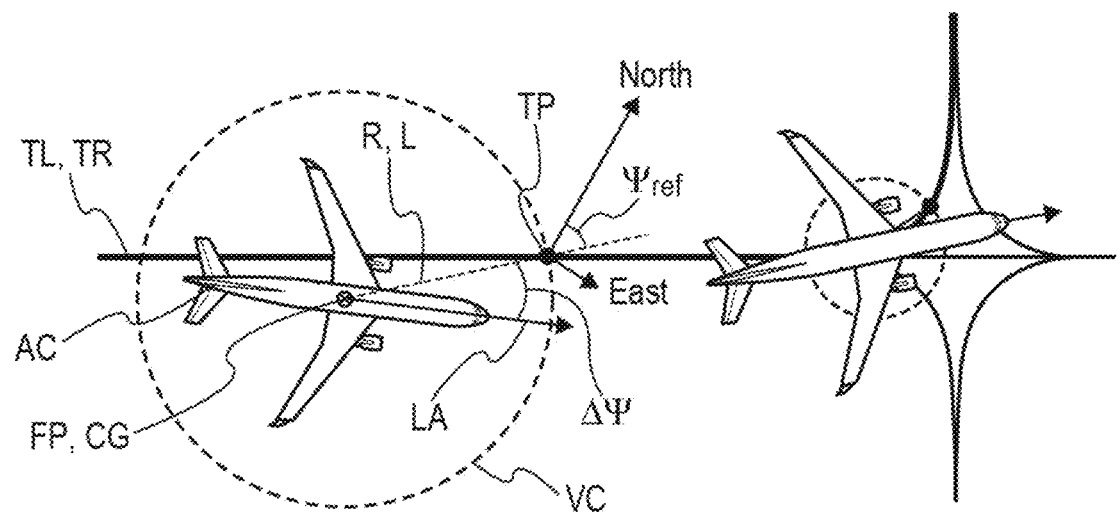
FIG. 2 is a diagrammatic top view of an aircraft following a taxi line traced on the ground according to an embodiment of the method according to the invention.

As shown in FIG. 2, the aircraft AC moving on the ground may have a lateral and/or angular deviation with respect to the taxi line TL containing the mark TP. The deviation is represented by an azimuth error ψΔ angle formed between a projection of a longitudinal axis LA of the aircraft AC and a straight line L joining the mark TP and a follower point FP on the aircraft, such as the center of gravity CG of the aircraft AC. The azimuth error ψΔ may also be represented in the virtual space of the digital trajectory by a projection of the longitudinal axis LA of the aircraft and a straight line L between the mark TP, e.g., CG of the aircraft, and the virtual position of the mark TP.

The azimuth error ψΔ is associated with a reference azimuth angle ψ formed between the straight line L joining the mark TP and the follower point FP, and an axis of a local landmark, such as a three-dimensional reference "North, East, Down" (NED) centered on the mark TP. In the example shown in FIG. 2, the reference azimuth angle ψ is between the straight line L and the North axis of the NED landmark.

The reference azimuth angle ψ and/or azimuth error ψΔ is/are determined by a calculation unit integrated in the marks unit 49.

The marks unit 49 comprises a generation unit configured to generate a virtual circle VC (FIG. 2) having a center positioned at the follower point FP and a radius R dependent upon a current speed and/or an acceleration of the aircraft AC. The faster the aircraft moves, the larger the virtual circle.

The virtual circle VC should intersect the taxi line TL and/or digital trajectory DR. The point of intersection is designated the mark TP. If there are two (or more) points of intersection, the point of intersection on the virtual circle nearest the destination of the aircraft or in the direction of movement of the aircraft is designated as the mark TP.

The marks unit 49 comprises a validation unit, configured to validate a first value of the azimuth by comparison with a second value of said azimuth. Said second value is obtained by a redundant device and/or a device functioning according to another position detection technology.

The operations described in relation to the units of initialization 46, of extension 47, of discrimination 48 and/or of marks 49, correspond, for example, with those performed successively in that order during one of the iterations conducted, frame-by-frame, by the second analysis unit 45.

The control unit 8 may be configured to drive the aircraft AC automatically to the taxi line TL to be followed, and in particular to the mark TP, in the event of a lateral and/or angular deviation of said aircraft in relation to the taxi line TL to be followed, or to drive the aircraft AC automatically along the North axis of the NED landmark, according to a lateral and/or angular deviation of said aircraft with respect to said North axis.

The control unit 8 is configured to receive from the detection unit 4 data indicating the reference azimuth angle ψ and/or to the azimuth error ψΔ. Based on this data item, the control unit 8 generates an order in the form of a first command to be sent towards a nose wheel steering (NWS), then a second command to be sent towards a steering hand wheel (SHW). It should be noted that the control unit 8 is configured to communicate with the actuators of the aircraft AC, such as the actuators of the NWS and/or SHW.

With respect to detecting the taxi line TL to be followed, the frames supplied by the acquisition unit 42 may be digitally processed to aid in the evaluation of the images and detection of the lines of the taxi line TL, including the PR1 and PR2. In particular the first iterative analysis unit 44 and/or the second iterative analysis unit 45 and the marks unit 49 may including image processing software and/or computer hardware. The detection unit 4 MAY include an image-processing unit 43 configured to transform the frames through successive operations.

Figure 4B:
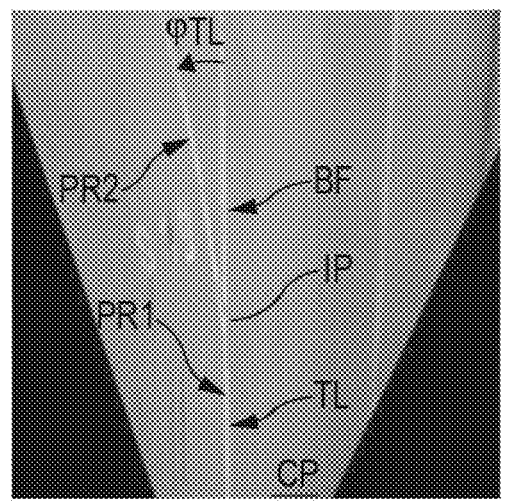
Figure 5B:
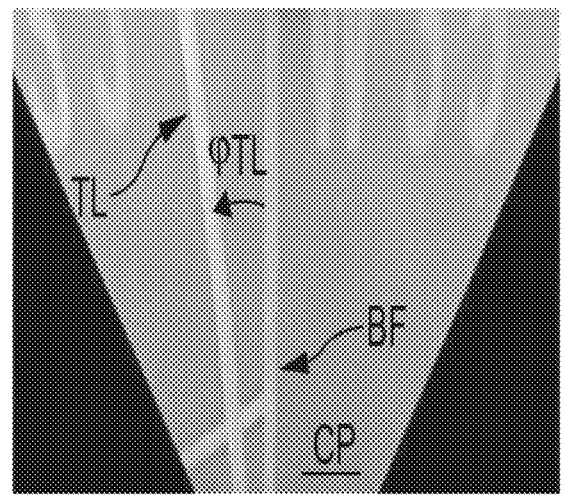

The image-processing unit 43 may include a homography unit, e.g., a software module, configured to transform the frames from an oblique view of a scene acquired by the acquisition unit 42 to a vertical view, e.g., top-down view, according to a hypothetical camera situated in the plumb line over the aircraft AC. This transformation makes allows for preservation of the linear properties of the lines shown in the frames, and in particular of the taxi lines shown in the frames. Also, for each taxi line, the transformation by homography preserves the center point. Furthermore, this transformation makes it possible to show on a single image plane the taxi line TL to be followed, the longitudinal axis LA of the aircraft AC, and/or the virtual circle VC. FIGS. 4b and 5b illustrate such a transformation on the frames of FIGS. 4a and 5a.

A comparison between FIGS. 4a and 5a on one hand and FIGS. 4b and 5b on the other shows that the rectilinear lines remain rectilinear after transformation by homography, whereas the curved lines are straightened after homography.

An image-processing unit 43 in the device 1 may include an image capture unit, e.g., software module, which receives images from the camera(s) and stores the images as the frames along with information regarding the time of image capture. The image processing unit may include a conversion unit, e.g., a software module, configured to convert, for each of the frames, a first color management system, called Red-Green-Blue (RGB) to a second color management system, called Hue, Saturation, Value (HSV).

The conversion to HSV aids system makes it possible in particular to recognize a specific color more easily, here the yellow color associated with the taxi line TL to be followed, as a variant, a single parameter, namely the hue, instead of varying three parameters as is the case in an operation of color recognition on a frame encoded according to the RGB system.

The image processing unit 43 may also comprise a binarization unit configured to detect and delete non-pertinent information in the frames, and thus to reduce the size of the files associated with said frames.

Figure 6A:
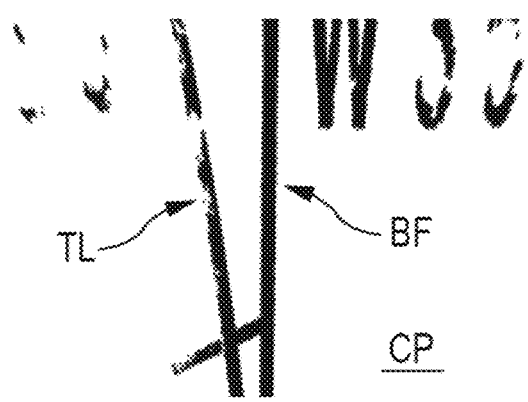
FIGS. 6a and 6b illustrate the raw image frame of FIG. 5a after a binarization operation, as shown in FIG. 6a, which is followed by a Hough transform shown in FIG. 6b.

FIG. 6a illustrates a result of a binarization performed on the frame of FIG. 5a. In the binarization process, a first class of pixels is distinguished, as showing marks, e.g. painted lines, on the taxiing circuit CP. The painted lines, or other visible markings such as reflectors, are the marks on the taxiing circuit which indicate possible pathways for the aircraft. The binarization process identifies a second class of pixels in the frames as corresponding to the deleted information. The pixels in the second class relate to images of the landscape around the taxiing circuit CP and other physical features not related to the taxiing circuit or the taxi line. This information in the second class, as well as the first class, is visible on the starting frame shown on FIG. 5a.

Figure 7:
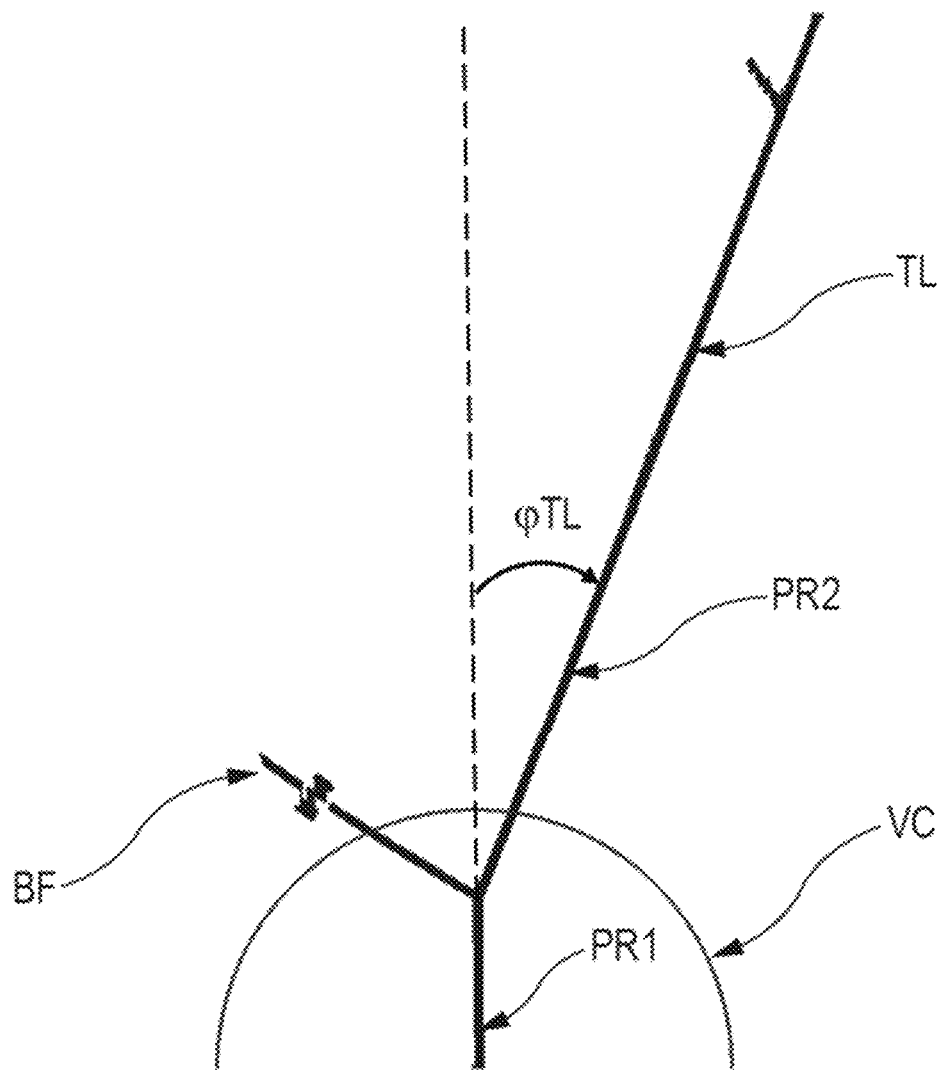
FIG. 7 illustrates a virtual circle generated in a frame.

Another result of binarization is illustrated on FIG. 7, showing a frame that contains in particular a taxi line TL to be followed as well as a line BF secant to said taxi line. FIG.

7 shows the result of both homography and binarization of a frame. The two lines BF and TL (which includes PR1 and PR2) shown in FIG. 7 are the first class of pixels. Image information in the raw frame captured by a camera that is not pertinent to tracking the taxi line is not shown in FIG. 7.

A virtual circle VC has been digitally applied to the frame shown in FIG. 7. The virtual circle VC is most applicable to a frame after the homography operation is conducted on the frame. Due to the homography operation, the relative actual lengths of the lines BF and TL are accurately represented, which is useful in the application of the virtual circle to the image. Because the lengths are accurately represented, the radius of the virtual circle with respect to the lines BF and TL may be used to analyze the when a point of intersection, such as between BF, PR1 and PR2 crosses the virtual circle for purposes of guiding the movement of the aircraft.

Also due to the homography operation, the angle φTL between the PR1 and PR2 can be accurately determined by analyzing the image shown in FIG. 7. The angle φTL indicates a change of direction to the right between two consecutive portions PR1, PR2 of the taxi line TL to be followed.

A taxi line can have discontinuities, such as shown in FIGS. 5a, 5b, 6a and 6b. Discontinuities may result from a trace appearing on the taxiing circuit by a vehicle wheel, or caused by crackling arising in paint forming said line. As shown in FIG. 6a, the discontinuities appear due to the binarization of the camera image captured by to form the frame, such as shown in FIG. 5a. To allow further evaluation of said frame, additional image processing is required.

Figure 6B:
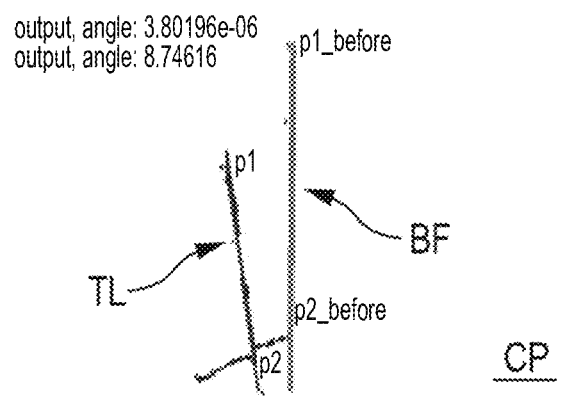

The image-processing unit 43 may include a recognition unit, e.g. a software module, for recognizing linear pieces on a discontinuous line. This recognition unit is configured to apply a Hough transform on said discontinuous line. Using a Hough transformation, the linear pieces identified by means of the recognition unit can then be regrouped to reconstruct a continuous line as is shown in FIG. 6b. This function of regrouping linear pieces is provided by a regrouping unit integrated in the image-processing unit 43. FIG. 6b illustrates a result of a Hough transform and a regrouping of linear pieces performed on the two lines of the frame shown on FIG. 6a, namely a taxi line TL to be followed and a line BF secant to said taxi line.

The aircraft AC can include a device 1 conforming to any one of the embodiments described above.

The device 1, as described above, is configured to implement a method PR for assisting the driving of an aircraft AC moving on the ground on a taxiing circuit CP comprising a taxi line TL to be followed by the aircraft AC, said line having a plurality of portions PR forming intersections IP between them.

Figure 3:
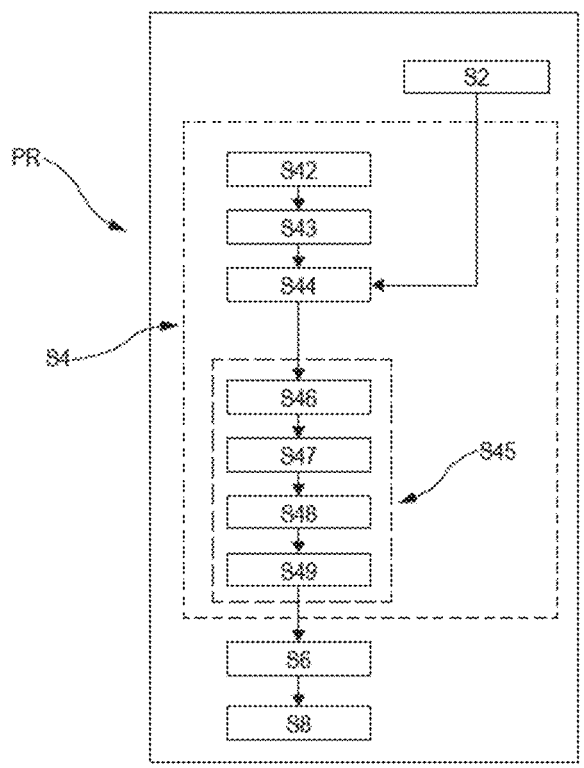
FIG. 3 diagrammatically illustrates steps of a method for assisting the driving of an aircraft moving on the ground, implemented by the device of FIG. 1.

FIG. 3 is a flow chart of a method PR that uses a digital modeling of the taxi line TL to be followed. This modeling, called digital trajectory TR, comprises nodes corresponding to the intersections IP of the taxi line TL to be followed.

Furthermore, the method PR comprises the following steps:
- a detection step S4 of the taxi line TL to be followed, implemented by the detection unit 4, consisting of detecting at least one of said intersections IP, and
- an increment step S6 to increment the counter associated with the digital trajectory TR, in response to the detection of said intersection IP, said counter counting a series of the nodes forming the digital trajectory TR.

The incrementation step can be a sub-step of the detection step.

The detection step S4 of the taxi line TL to be followed comprises a download sub-step, implemented by the download unit integrated in the detection unit 4, aiming to download the digital trajectory TR from an outside server.

It should be noted that the digital trajectory TR is generated during a preliminary step S2, called generation step, implemented by the trajectory generator 2.

The detection step S4 of the taxi line TL to be followed comprises an acquisition sub-step S42, implemented by the acquisition unit 42, including capturing images, during movement of the aircraft AC on the taxiing circuit CP, a sequence of frames of the scene near the aircraft AC, such as immediately in front of the aircraft. It can in particular be a scene in front of the aircraft AC, said scene comprising in particular the taxiing circuit CP as well as the taxi line TL to be followed, traced on said taxiing circuit.

Advantageously, the detection step S4 of the taxi line TL to be followed comprises a first sub-step of iterative analysis of the frames, called first iterative analysis S44, aiming to detect passage from one of said intersections IP in said frames.

In particular, this first iterative analysis S44 comprises, in the event of detection of secant lines in one of the frames, activation of a first test indicating to proceed with said first analysis S44 without incrementing the counter, if it is one of the intersections IP being crossed, or to proceed with said first iterative analysis S44 while incrementing the counter, if it is a new one of said intersections IP.

The first iterative analysis S44 is conducted by means of said first analysis unit 44.

The detection step S4 of the taxi line TL to be followed may comprises a second sub-step of iterative analysis of the frames, called second iterative analysis S45, aiming to detect the taxi line TL to be followed in the frames, and in particular a current portion PR of said taxi line. This second iterative analysis S45 is conducted in a manner nested with the first iterative analysis S44, by means of said second analysis unit 45.

In particular, the second analysis unit 45 may be supplied with frames by the second camera mounted behind the nose landing gear of the aircraft AC.

The detection step S4 of the taxi line TL to be followed may include an initialization sub-step S46, implemented by the initialization unit 46 integrated in the detection unit 4, consisting of initializing, in a first one of said frames, a start of the taxi line TL to be followed.

The detection step S4 of the taxi line TL to be followed may include an extension sub-step S47, implemented by the extension unit 47, consisting of extending, in one of said frames, a contour of the taxi line TL to be followed, for comparison with one of the following frames.

The detection step S4 of the taxi line TL to be followed may include a discrimination sub-step S48, implemented by the discrimination unit 48 integrated in the detection unit 4, consisting of determining the taxi line TL to be followed among several taxi lines present in the frames. In particular, this discrimination sub-step S48 comprises a first calculation operation, implemented by the first calculation unit of the discrimination unit 48, consisting of calculating, in said frames, an angle formed by two consecutive portions PR of the taxi line TL to be followed.

The detection step S4 of the taxi line TL to be followed may include a marks sub-step S49, implemented by the marks unit 49 integrated in the detection unit 4, which determines, in the frames, a mark TP along the taxi line TL to be followed.

This marks sub-step S49 comprises a second calculation operation, implemented by a second calculation unit integrated in said marks unit 49, consisting of determining, in the frames, an angle, called azimuth error $\psi\Delta$, formed between a projection on the ground of a longitudinal axis LA of the aircraft AC and a straight line L joining the mark TP and a point, called follower point FP, positioned on said projection. In particular, the follower point FP can be an image of a center of gravity CG of the aircraft AC on said projection.

The azimuth error $\psi\Delta$ is associated with an azimuth reference angle $\psi_{ref}$. The azimuth reference angle $\psi_{ref}$ is an angle between a straight line L extending through the mark TP and the follower point FP, and an axis of a local coordinate system, such as a "North, East, Down" (NED) coordinate reference centered on the mark TP. More specifically, the azimuth reference angle $\psi_{ref}$ may be an angle between the straight line L and the North axis of the NED landmark.

The azimuth may be determined during a third calculation operation implemented by the third calculation unit integrated in the marks unit 49.

The marks sub-step S49 may comprise an operation of generation of a virtual circle VC having a center positioned at the follower point FP and a radius R depending on a speed and/or an acceleration of the aircraft AC. With the taxi line TL to be followed, this virtual circle VC forms at least one intersection point corresponding to the mark TP. It should be noted that this operation of generation of the virtual circle is implemented by the generation unit integrated in the marks unit 49.

Finally, this marks sub-step S49 comprises a validation operation, implemented by a validation unit integrated in said marks unit 49, consisting of validating a first value of the azimuth, by comparison with a second value of said azimuth.

The method PR may comprises a control step S8 implemented by a control unit 8, consisting of driving the aircraft AC automatically along the taxi line TL to be followed, in particular to the mark TP, in the event of a lateral and/or angular deviation of the aircraft AC in relation to said line to be followed, or to drive the aircraft AC automatically along the North axis of the NED landmark, according to a lateral and/or angular deviation of the aircraft AC with respect to said North axis.

The control step S8 comprises a generation sub-step of an order based on data relative to the azimuth or data relative to the azimuth error $\psi\Delta$. This order takes the form of a first command to be sent to a nose wheel steering (NWS), then a second command to be sent to a steering hand wheel (SHW).

Advantageously, the method PR comprises a sub-step of image processing S43 aiming to transform the frames obtained during the acquisition sub-step S42. This image-processing sub-step S43 is implemented by the image-processing unit 43. Furthermore, this image-processing sub-step S43 comprises a series of operations, each dedicated to a particular type of image processing In particular, the image processing sub-step S43 comprises a homography operation, implemented by the homography unit integrated in the image processing unit 43, consisting of transforming, in the frames, an oblique view of the scene according to the acquisition unit 42 to a vertical view of said scene according to a hypothetical camera situated in the plumb line of the aircraft AC.

The image processing sub-step S43 also comprises a conversion operation, implemented by the conversion unit 43b integrated in the image processing unit 43, consisting of converting, in the frames, a first RGB color management system to a second HSV color management system.

Finally, the image processing sub-step S43 comprises a binarization operation, implemented by the binarization unit integrated in the image processing unit 43, consisting of binarizing the frames.

It should be noted that the lines present in the frames can have discontinuities. So as to reconstruct continuous lines, the image processing sub-step S43 comprises a Hough transform aiming to recognize linear pieces in the discontinued lines, as well as a regrouping operation aiming to reconnect said pieces.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the driving of an aircraft moving on the ground on a taxiing circuit including a taxi line to be followed by the aircraft, the taxi line includes a plurality of portions with intersections between the portions, the method includes:
    using a digital mode of the taxi line to automatically create a digital trajectory, wherein the digital trajectory includes nodes corresponding to the intersections;
    automatically detecting the taxi line on the ground using a detection unit on the aircraft, wherein the detecting includes:
        acquiring a series of frames that capture a series of images of regions on the ground near the aircraft, wherein the series of images include at least a portion of the taxi line,
        detecting a line corresponding to the taxi line appearing in a first frame of said frames,
        virtually extending the detected line, and
        comparing the virtually extended line with a line in a second frame of said frames to identify the taxi line in the second frame,
    sequentially detecting the intersections in the taxi line shown in the frames;
    incrementing a counter associated with the digital trajectory in response to the detection of each of the intersections to count the intersections as the aircraft moves along the taxi line; and
    using the count of the intersections to count the nodes of the digital trajectory and thereby determine a current position of the aircraft on the digital trajectory.

2. The method of claim 1, wherein the detection of the taxi line includes a first iterative analysis which iteratively analyzes the series of frames to detect passage of at least one of said intersections in a consecutive sequence of the frames.

3. The method of claim 2, wherein the first iterative analysis includes iteratively:
    detecting one of the intersections in one of the frames;

in response to the detection, applying a first test to determine if the detected intersection was detected in a previous one of the frames;

not performing the step of incrementing the counter if the first test determines that the detected intersection had been previously detected, and performing the step of incrementing the counter if the first test determines that the detected intersection had not been previously detected.

4. The method of claim 2, wherein in the first iterative analysis the series of frames are of images captured by a first camera mounted in a cockpit of the aircraft.

5. The method of claim 2, wherein the detection of the taxi line includes a second iterative analysis comprising detecting the taxi line in the series of frames.

6. The method of claim 5, wherein the second iterative analysis includes capturing second frames of images of the by a camera mounted behind a nose landing gear of the aircraft.

7. The method of claim 1, wherein the detection of the taxi line includes using an initialization unit integrated in said detection unit to detect in one of the frames a start of the taxi line.

8. The method of claim 1, wherein the detection of the taxi line includes discriminating the taxi line appearing in one of the frames from a plurality of lines appearing in the one of the frames.

9. The method of claim 8, wherein the discrimination of the taxi line includes:

calculating an angle between lines appearing in one of the frames;

comparing the calculated angle to a predefined angle in the taxi line at a region in the taxi line proximate the current position, and determining that the lines correspond to the taxi line if the calculated angle corresponds to the predefined angle.

10. The method of claim 1, wherein the detection of the taxi line includes determining a mark along the taxi line appearing in one of the frames.

11. A device to assist guiding an aircraft moving on the ground along a taxiing circuit including a taxi line to be followed by the aircraft, wherein the taxi line includes a plurality of portions and intersections between the portions, the device including:

a camera system configured to capture a series of frames that capture a series of images of regions on the ground near the aircraft in the taxi circuit, wherein the series of images include at least a portion of the taxi line, a processor configured to:

store a digital model of the taxi line including nodes, wherein each of the nodes corresponds to a respective one of the intersections between the portions of the taxi line;

detect a line in a first frame of said frames that corresponds to the taxi line, virtually extend the line corresponding to the taxi line, compare the virtually extended line with a line in a second frame of said frames to identify the taxi line in the second frame, detect at least one of the intersections based on analysis of frames in the series of frames of the images captured by the camera system of the regions on the ground near the aircraft in the taxiing circuit;

increment a counter as each of the intersections are detected to count the intersections reached by the aircraft, and determine one of the nodes in the digital model corresponding to the detected intersection based on the count of the intersections.

12. A method to assist in guiding an aircraft along a taxi line in a ground taxiing circuit, wherein the taxi line includes a plurality of straight line portions and intersections between the portions, the method includes:

automatically capturing a series of images of the taxiing circuit proximate the aircraft as the aircraft follows the taxi line, wherein the images are captured by a camera mounted to the aircraft;

detecting a line corresponding to the taxi line appearing in a first image of the series of images, virtually extending the detected line, comparing the virtually extended line with a line in a second image of the series of images to identify the taxi line in the second image, automatically analyzing each of the images to detect intersections along the taxi line as the aircraft follows the taxi line;

automatically incrementing a counter as each of the intersections is detected to count the intersections reached by the aircraft;

using the count to automatically count nodes on a digital map of the taxi line and the nodes correspond to the intersections in the taxi line, and automatically determining a current position of the aircraft on the taxi line based on the count of nodes reached by the aircraft.

13. The method of claim 12, wherein the detection of the intersections along the taxi line includes repeatedly:

detecting one of the intersections in one of the frames of the series of the images;

in response to the detection, applying a first test to determine if the detected intersection was detected in a previous one of the images;

not performing the step of incrementing the counter if the first test determines that the detected intersection had been previously detected, and performing the step of incrementing the counter if the first test determines that the detected intersection had not been previously detected.

14. The method of claim 12, wherein the detection of the intersections includes:

detecting a first straight line portion of the taxi line in one of the images, detecting a second straight line portion of the taxi line in the one of the images;

calculating an angle formed by the first and second line portions;

comparing the angle to a predefined angle of virtual first and second line portions of the digital map of the taxi line, wherein the virtual first and second line portions intersect at the node to be next counted;

performing the step of incrementing the counter if the angle matches the predefined angle.

* * * * *